Patented Apr. 13, 1937

2,076,645

UNITED STATES PATENT OFFICE 2,076,645

PROCESS FOR TREATING CARBONACEOUS MATERIALS AND PRODUCT

Heber A. Ingols, Wilmington, and Paul F. Pie, Jr., Newark, Del., assignors to Darco Corporation, Wilmington, Del., a corporation of Delaware No Drawing. Application December 20, 1935, Serial No. 55,428

4 Claims. (Cl. 252—3)

This invention relates to granular activated carbon and consists in an improved process for treating carbonaceous materials and the product thereof.

Granular activated carbon is frequently used in the form of a filter bed, and the liquid or gas being treated is passed through the bed of carbon. In the treatment of water with granular carbon, it has been customary to pass the water downwardly through the bed of carbon. Occasionally these down-flow filters are "backwashed" by an upward flow of water through the bed of carbon. It has also been proposed that the carbon beds be normally operated with an upward flow of water.

A difficulty heretofore encountered with certain types of granular activated carbon is that when placed in water the carbon has a tendency to wet slowly and to float or merely suspend itself in the water. This refusal of the carbon to sink and form a bed prevents the full use of the carbon during periods of downward flow. A portion of the carbon floats above the liquid surface and is unavailable as adsorption surface. In addition, the submerged portion of the carbon is not properly wetted and the pores are inaccessible to the substances which the carbon can adsorb. Furthermore, during periods of upward flow, the floating carbon is frequently washed out of the filter and lost.

These difficulties are accentuated when it is desired to operate the filter normally with an upward flow of water. The non-sinkable carbon will be carried out of the filter unless a screen is provided above the carbon to retain the carbon in the filter. The addition of an upper screen renders the carbon bed inaccessible, increases the resistance to the flow of water and is otherwise disadvantageous. For these reasons, non-sinkable activated carbons are generally considered to be unsuitable for use in water filters.

It is an object of this invention to produce a sinkable granular activated carbon.

It is a further object of this invention to produce a granular activated carbon having a block density greater than 1.0 and to render the pores in the carbon readily accessible to adsorbates.

Other objects of the invention will hereinafter more fully appear.

We have found that by substantially excluding air and cooling activated carbon in an atmosphere of steam at the end of conventional activation processes, the carbon is rendered sinkable and the difficulties heretofore mentioned are overcome. Granular carbons tenaciously retain entrained air or gas, and once adsorbed, it is very difficult to remove the same by simply submerging or agitating the carbon in water. By cooling the granules in an atmosphere of steam at the conclusion of activation, however, we have found that the attenuation of the gas in the carbon pores due to cooling, is accompanied by sorption of steam and condensation of water in the pores of the carbon. This increases the block density of the carbon and at the same time renders the pores more accessible to adsorbates where the carbon is subsequently used in water treatment.

Preferably, the carbon is cooled in a steam atmosphere as the carbon is discharged from the activating furnace, and while air is substantially excluded. The carbon need not be completely saturated with moisture, and in the preferred method the cooling in the steam atmosphere progresses only until the block density of the carbon is greater than 1.0. Thereafter, the cooling may take place in air. By block density is meant the grams per cubic centimeter of the granules as measured in mercury.

For example, conventional activating equipment commonly produces granular activated carbon having a block density on the order of 0.6. Frequently, this carbon is found unsuitable for water filtration as when placed in water it merely floats or becomes suspended and refuses to sink. Without other change in the activating process we have found that by discharging the carbon from the activating furnace into a steam bath while substantially excluding air and cooling the carbon in the presence of the steam the block density of the carbon is increased to greater than 1.0. By using steam of from 50% to 100% quality at atmospheric pressure, we have found that a density greater than 1.0 is obtained with most carbons some time after the temperature of the carbon granules has been lowered to 100° C. Preferably the granules are cooled in a steam atmosphere until the final block density is greater than 1.0 and less than 1.2. The time and degree of cooling required will depend on the particular properties of the activated carbon. By controlling the density within the limits of 1.0 to 1.2, the carbon is ultimately found to contain more moisture than would normally be taken up from air of 90% relative humidity, but the carbon is not "wet" and increased shipping costs are avoided.

Granular carbons having a block density greater than 1.0 may be prepared from granular carbons having a block density of less than 1.0 by other methods, such for example as the process disclosed in our co-pending application Ser. No. 55,429 filed December 20, 1935. However, our preferred process disclosed herein is advantageous in that the carbon is not wetted and the process may be applied directly at the activating furnace.

It is to be understood that any type of cooling equipment may be utilized so long as the carbon granules are subjected to an atmosphere of steam, and air is substantially excluded. Moreover, the illustration given above is only by way of example and the invention is not limited thereto. It is merely necessary to cool the carbon until the block density is greater than 1.0. The specific degree to which the temperature must be lowered to produce the optimum product will obviously depend upon the nature of the particular carbon treated.

In the following claims, by the term "granular carbon" is meant a carbon the granules of which are sufficiently large so that practically all will be retained on a 30 mesh sieve. By "moisture" is meant moisture consisting essentially of $H_2O$.

What we claim is as follows:

1. In the process of manufacturing granular activated carbon for use in the purification of aqueous mediums the step comprising cooling the hot carbon in an atmosphere of steam until the block density is greater than 1.0 grams per cubic centimeter, thus obtaining a sinkable carbon suitable for use without further treatment.

2. In the process of manufacturing granular activated carbon for use in the purification of aqueous mediums the step comprising cooling the hot carbon in an atmosphere of steam until the carbon is sinkable in water, thus obtaining a sinkable carbon suitable for use without further treatment.

3. An article of manufacture for use in the purification of aqueous mediums comprising granular activated carbon readily sinkable in water containing sufficient moisture to cause the granules to have a block density greater than 1.0 grams per cubic centimeter.

4. An article of manufacture for use in the purification of aqueous mediums comprising granular activated carbon readily sinkable in water containing sufficient moisture to have a block density between 1.0 and 1.2 grams per cubic centimeter.

PAUL F. PIE, Jr.
HEBER A. INGOLS.